Oct. 16, 1956  C. F. BENSON  2,767,297
RADIANT ENERGY OVEN
Filed April 22, 1954

INVENTOR.
Charles F. Benson
BY
Otura Earl
Attorney

United States Patent Office 2,767,297
Patented Oct. 16, 1956

2,767,297

RADIANT ENERGY OVEN

Charles F. Benson, Jackson, Mich.

Application April 22, 1954, Serial No. 424,895

11 Claims. (Cl. 219—35)

This invention relates to radiant energy oven.

The principal objects of this invention are:

First, to provide an oven for heating objects to high temperature with a minimum amount of radiant energy.

Second, to provide an oven in which most of the heat energy is concentrated on the objects to be heated and is not dissipated or absorbed in the oven walls.

Third, to provide an oven which can be turned on and off for immediate utilization of the heat developed in the oven and which does not require prolonged heating and cooling periods.

Fourth, to provide an oven for heat treating or baking materials which will quickly bring the materials to a high temperature and any lower temperature with a minimum of electrical energy.

Fifth, to provide an oven which is safe and light because its walls do not become heated to a dangerous temperature and do not need extensive insulation.

Other objects and advantages of the invention will be apparent from a consideration of the following description and claims. The drawings, of which there is one sheet, illustrate two highly practical forms of the invention.

It has previously been proposed to heat work pieces for various reasons by subjecting the work to radiant energy in the form of infra red rays and infra red ray devices in the form of lamps are available commercially. However, all uses of these lamps have depended primarily if not entirely, upon the direct application of the rays from the lamp on the work and if one or two lamps have been in sufficient to supply the desired amount of heat additional lamps have been arranged in banks and rings around the work. The result of this arrangement is that ovens utilizing infra red rays for heating have required excessive amounts of current and have been expensive to build and operate. The present invention provides structure for more efficient and practically complete utilization of all of the energy radiating from an infra red lamp with the result that a single or much fewer number of lamps will heat the work to a very high temperature. Essentially the invention involves the provision of walls which substantially enclose and support the work and which are highly reflective so as to return all the radiant energy into the interior of the oven where it is absorbed by the work. The source of radiant energy is directed into the oven and may be supported by the walls of the oven.

Figure 1:
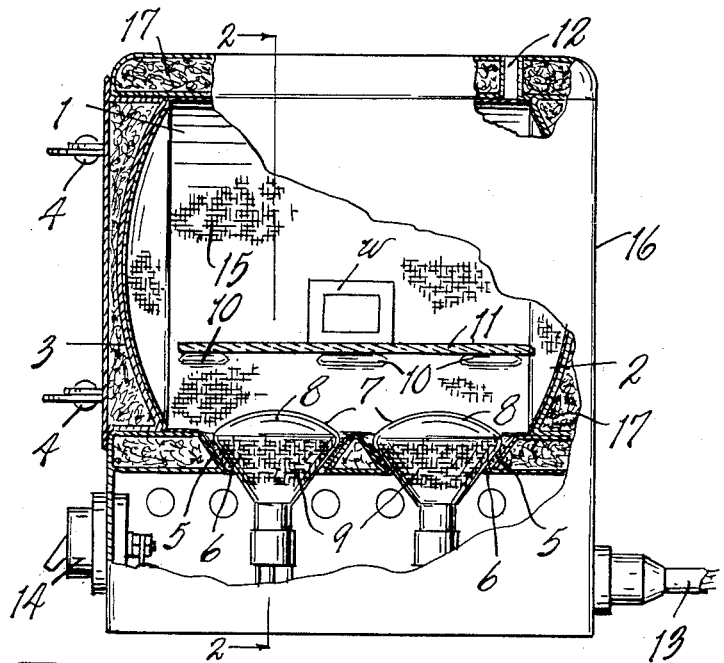
Fig. 1 is a side elevational view partially broken away in cross-section of a first form of the oven.
Figure 2:
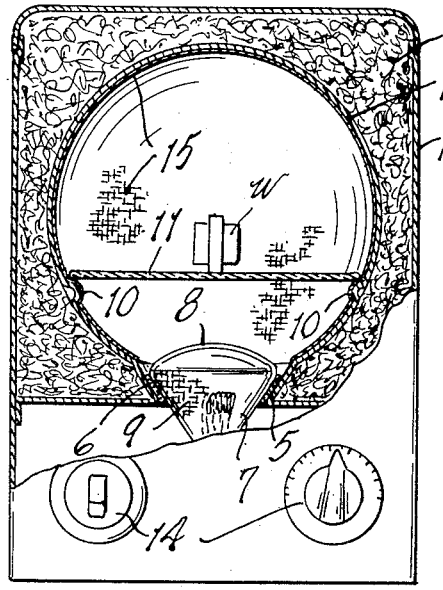
Fig. 2 is a front elevational view partially broken away in cross-section along the plane of the line 2—2 in Fig. 1.

The first form of the invention illustrated in Figs. 1 and 2 includes a cylindrical tubular metal body 1 having a first internally concave end wall 2 and a swingable internally concave end wall or door 3 hinged as at 4 to the other end of the tubular body. Along its bottom the tubular body 1 is provided with a pair of downwardly converging conical flanged openings 5 and the flanges are desirably faced with asbestos or other heat resistant soft strips 6 to form seats for a pair of upwardly directed infra red heat lamps 7. The lamps 7 have conical bodies seated on the strips 6 and lenses 8 directed upwardly into the oven space within the body and the end walls. The lamps 7 are desirably of high capacity capable of delivering in the neighborhood of 1500 watts at 230 volts. Such lamps are presently available and have interior reflecting coatings of gold on their conical surfaces as is indicated at 9.

The opposite sides of the tubular body 1 are provided with inwardly pressed integral projections 10 which form supports for a flat work support plate 11 in spaced relation above the lamps 7. The flat work support 11 is capable of passing or transmitting infra red rays with little loss of energy. Fused quartz plates or tempered silica glass are suitable metals for this purpose as they will transmit most of the infra red rays applied to them without themselves being heated. Desirably a vent pipe is provided as at 12 to permit the escape of vapors emanating from the work as the work is heated. A suitable electrical supply cable is indicated at 13 and control switches as desired are indicated at 14. One switch may conveniently be of the time operated type.

The work to be heated is placed on the support plate 11 as at W in Figs. 1 and 2. When the lamps are turned on a large proportion of rays emanating from the lamps will be directed to the surface of the work. Those rays which miss the work will pass through the support plate 11 with little loss of energy and will strike the inner surfaces of the body 1 and end walls 2 and 3. These walls are highly polished and provided with a heat reflecting surface such as polished gold indicated at 15 and the rays will be reflected from the gold surface with little reduction in energy either directly or indirectly to the surface of the work. All surfaces of the work are thus subjected to infra red radiation and what is more important the rays emanating from the lamps will all be confined and directed to the work to raise the temperature of the work.

With this arrangement it is possible to raise the temperature of the work to as high as 1800° F., or to any lower temperature, depending upon the time of operation of the lamps and the mass of the work. The work may consist of ceramic materials placed in the oven for baking or glazing or small tools and machine parts placed in the oven for heat treating. Substantially the entire energy of the lamps is immediately applied to the work when the lamps are turned on and it is unnecessary to bring the oven to any pre-heated temperature before placing the work in the oven. The oven itself does not become heated to any substantial or dangerous temperature and it is unnecessary to provide a prolonged cooling period for the oven after use.

Desirably the tubular body 11 is enclosed in an outer box-like case 16 for supporting the oven and the lamps and heat insulating material 17 may be packed between the case and the tubular body. The heat insulating material is not really necessary for the purpose of safety or efficiency of the oven as the gold lining of the oven prevents the outer surface thereof from becoming dangerously heated. However, the using public normally expects that ovens capable of heating to a high temperature should be insulated, so the insulation is provided.

Figure 3:
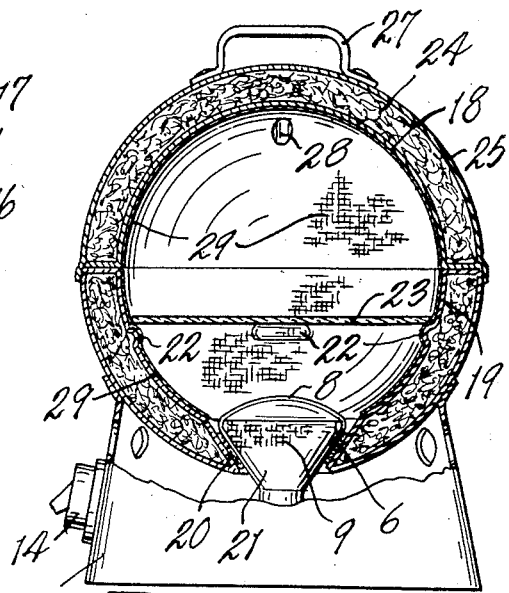
Fig. 3 is a vertical cross-sectional view through a modified form of oven.

The second form of oven illustrated in Fig. 3 illustrates a modified form of oven having a spherical body divided horizontally into an upper removable cover 18 and a lower work supporting portion 19. The lower portion 19 has a single downwardly flanged aperture 20 for receiving and supporting a single infra red lamp 21. Indentations 22 in the sides of the lower portion support a circular work support plate 23 of quartz on tempered glass as in the first form of the oven.

As in the first form of the oven the inner body is desirably enclosed by a layer of insulating material 24 and an outer case 25. A circular pedestal 26 forms a stable support for the lower portion of the case and a handle 27 attached to the upper portion of the case permits the oven to be opened for inserting the work. A vent from the oven is provided at 28 and the entire inner surface of the oven is polished and plated with gold as at 29. The modified form of oven and its spherical shape is somewhat more efficient than the first form of the oven as the spherical walls more efficiently reflect the infra red rays to the center of the oven where the work is supported. However the spherical oven is more limited in size and capacity than the tubular oven and is not so well adapted for handling elongated work pieces.

In both forms of the oven the polished gold coating is preferred as being the most efficient reflector of infra red rays. However other highly polished surfaces will produce a similar effect to a somewhat lower degree. The ovens are safe and convenient to operate since they do not become dangerously heated and are immediately effective upon turning on the infra red ray lamps. All of the energy delivered to the lamps is transmitted to the work so that the ovens are very economical in operation. The ovens are relatively light and are easily portable in smaller sizes. The same principles of reflected infra red rays can be incorporated in larger ovens and it is possible and practical to increase the number of lamps operating in a single oven by extending the length of a tubular oven or by positioning additional lamps at other locations along the sides of the oven. If desired the oven may take the form of a tunnel with a conveyor for moving the work therethrough.

Having thus described the invention, what is claimed to be new and is desired to be secured by Letters Patent is:

1. An oven comprising, a body having an interiorly concave circularly rounded cross-section, interiorly concave end walls coacting with said body to enclose an oven space, one of said end walls being hinged and constituting a door, a plurality of radiant energy devices in the form of beam directing infra red lamps mounted in the bottom of the wall of said body and directed into said space, means forming a vent from said space, means in the form of projections pressed inwardly from the walls of said body forming supports on said body in spaced relation above said devices, and a work support in the form of a plate of fused quartz and translucent to infra red rays supported on said supports, all the interior surfaces of said space being polished and having a reflecting gold coating.

2. An oven comprising, a body having an interiorly concave cross-section, end walls coacting with said body to enclose an oven space, one of said end walls constituting a door, a plurality of radiant energy devices in the form of beam directing infra red lamps mounted in the bottom of the wall of said body and directed into the said space, means forming a vent from said space, means forming supports on said body in spaced relation above said devices, and a work support in the form of a plate of fused quartz and translucent to infra red rays supported on said supports, all the interior surfaces of said space being polished and having a reflecting gold coating.

3. An oven comprising, a body having an interiorly concave circularly rounded cross-section, interiorly concave end walls coacting with said body to enclose an oven space, one of said end walls being hinged and constituting a door, a radiant energy device in the form of beam directing infra red lamp mounted in the bottom of the wall of said body and directed into said space, means forming a vent from said space, means in the form of projections pressed inwardly from the walls of said body forming supports on said body in spaced relation above said device, and a work support in the form of a plate of fused quartz and translucent to infra red rays supported on said supports, all the interior of said space being polished and having a reflecting gold surface.

4. An oven comprising, a body having an interiorly concave circularly rounded cross-section, interiorly concave end walls coacting with said body to enclose an oven space, one of said end walls being hinged and constituting a door, a radiant energy device in the form of a beam directing infra red lamp mounted in the bottom of the wall of said body and directed into said space, means forming supports on said body in spaced relation above said device, and a work support in the form of a plate translucent to infra red rays supported on said supports, the interior of said space having a reflecting surface.

5. An oven comprising, a body having an interiorly concave cross-section, end walls coacting with said body to enclose an oven space, a door opening to said space, a radiant energy device mounted in the wall of said body and directed into the said space, means forming supports on said body in spaced relation to said device, and a work support in the form of a plate translucent to infra red rays supported in said body on said supports, the interior of said oven being polished and having a reflecting surface.

6. An oven comprising, a body having an interiorly concave cross-section, end walls coacting with said body to enclose an oven space, a door opening to said space, radiant energy device mounted in the wall of said body and directed into the said space, and a work support in the form of a plate translucent to infra red rays supported in said body, the interior of said oven being polished and having a reflecting surface.

7. An oven comprising a body having substantially entirely interiorly concave and spherical walls, part of said walls being movable to provide access to the oven, a radiant energy device supported in a wall of said body and directed into the body, and means for supporting work in said body including projections on the insides of the body and a plate translucent to infra red rays supported on said projections, the inside of said body having a reflecting polished gold surface.

8. An oven comprising a body having substantially entirely interiorly concave walls, part of said walls being movable to provide access to the oven, a radiant energy device directed into the body, and means for supporting work in said body, the inside of said body having a reflecting surface.

9. An oven comprising, an upwardly opening hemispherical body member and coacting hemispherical cover member, a work supporting plate translucent to infra red rays supported in said body member, and an infra red ray device mounted in said body member and directed into said body member in spaced relation to said plate, the insides of said members having infra red reflecting gold surfaces.

10. An oven comprising, an upwardly opening hemispherical body member and coacting hemispherical cover member, a work supporting plate translucent to infra red rays supported in said body member, and an infra red ray device mounted in one of said members and directed into said body member in spaced relation to said plate, the insides of said members having infra red reflecting surfaces.

11. An oven comprising walls forming an enclosure, a substantial portion of said walls being interiorly concave, means providing access to the enclosure, a radiant energy device directed into the enclosure and toward a concave portion of the walls, and means translucent to infra red rays for supporting objects to be heated in spaced relationship with said device and within the concave portions of the walls, the concave walls having an infra red ray reflecting surface.

References Cited in the file of this patent

UNITED STATES PATENTS

| | | |
|---|---|---|
| 1,552,767 | Shoenberg | Sept. 8, 1925 |
| 2,112,731 | Bruning | Mar. 29, 1938 |
| 2,305,056 | Austin | Dec. 15, 1942 |
| 2,340,354 | Wells | Feb. 1, 1944 |
| 2,662,964 | Simms | Dec. 15, 1953 |